United States Patent
Hall et al.

(10) Patent No.: US 7,103,026 B2
(45) Date of Patent: Sep. 5, 2006

(54) USE OF CHIP REPETITION TO PRODUCE A FLEXIBLE BANDWIDTH DS-CDMA SYSTEM

(75) Inventors: Eric K. Hall, Holliday, UT (US); Richard B. Ertel, Midvale, UT (US); Thomas R. Giallorenzi, Riverton, UT (US)

(73) Assignee: L-3 Communications Corporation, New York, NY (US)

( * ) Notice: Subject to any disclaimer, the term of this patent is extended or adjusted under 35 U.S.C. 154(b) by 1032 days.

(21) Appl. No.: 10/038,176

(22) Filed: Oct. 24, 2001

(65) Prior Publication Data

US 2002/0172180 A1 Nov. 21, 2002

Related U.S. Application Data

(60) Provisional application No. 60/243,808, filed on Oct. 27, 2000.

(51) Int. Cl.
*G01R 31/08* (2006.01)

(52) U.S. Cl. ............. 370/335; 370/208; 370/342; 370/320; 375/130; 375/134; 375/136; 375/145; 375/149

(58) Field of Classification Search .............. None
See application file for complete search history.

(56) References Cited

U.S. PATENT DOCUMENTS 5,204,876 A * 4/1993 Bruckert et al. ............ 375/130

FOREIGN PATENT DOCUMENTS

WO      WO 98/45960      * 10/1998

* cited by examiner

*Primary Examiner*—Phirin Sam
*Assistant Examiner*—Robert W. Wilson
(74) *Attorney, Agent, or Firm*—Harrington & Smith LLP

(57) ABSTRACT

A method is disclosed for obtaining a spreading code set for a code division multiple access (CDMA) communications system. The method includes (a) generating a P'×P' spreading code set where P'=P/N, where P is the spreading gain in chips/symbol and where N is an integer multiple of 2; and (b) replicating chips in each spreading code by N to produce a P'×P spreading code set. The step of generating may include randomizing the spreading code set by performing at least one or row or column permutation. The P'×P spreading code set is subsequently loaded into system hardware for operating the system hardware with a bandwidth that is less than the bandwidth that would be required to operate with the P'×P' Hadamard spreading code set. The CDMA system may be a synchronous, direct sequence code division multiple access communications system.

14 Claims, 9 Drawing Sheets

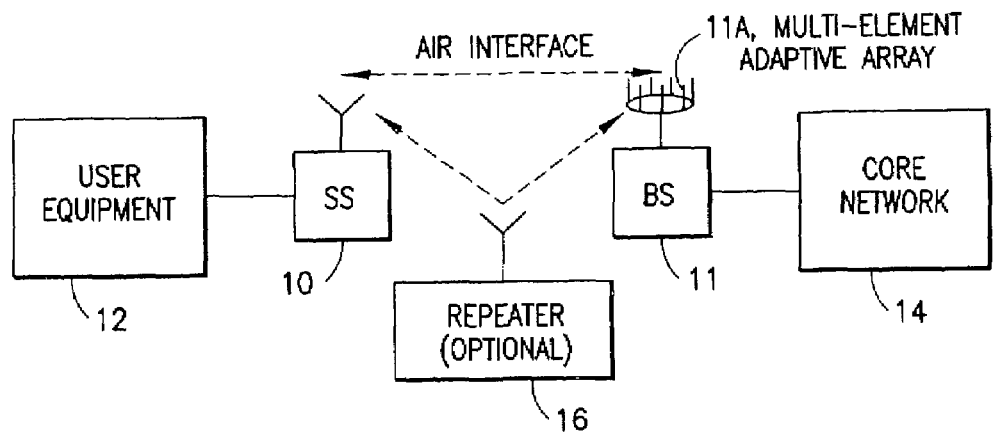
FIG.1  WIRELESS ACCESS REFERENCE MODEL
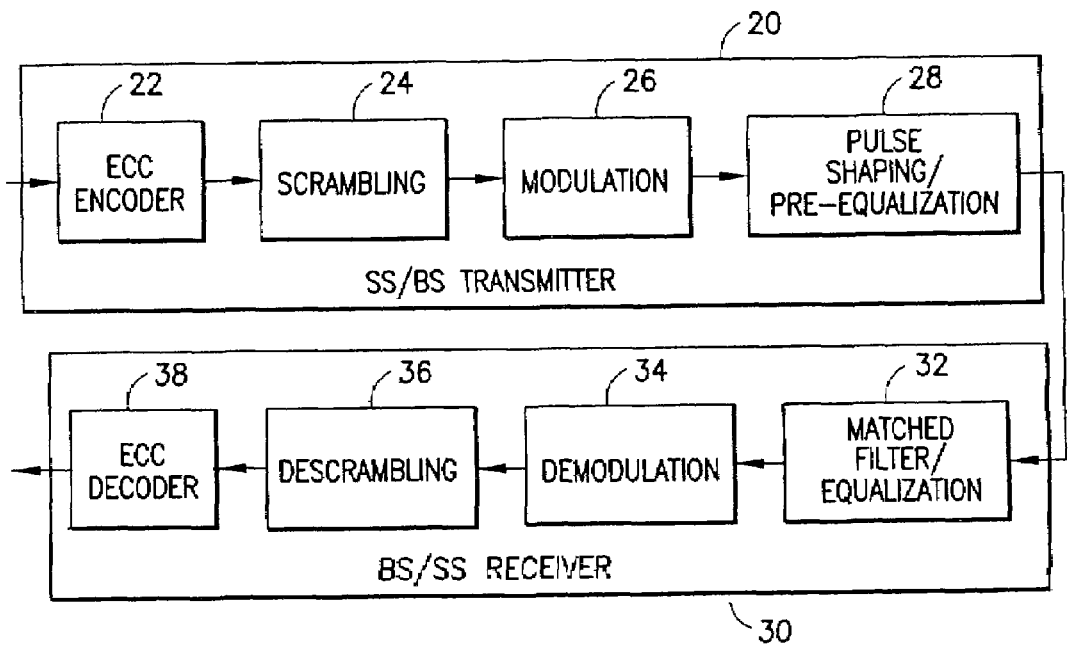
FIG.2  PHY REFERENCE MODEL SHOWING DATA FLOW
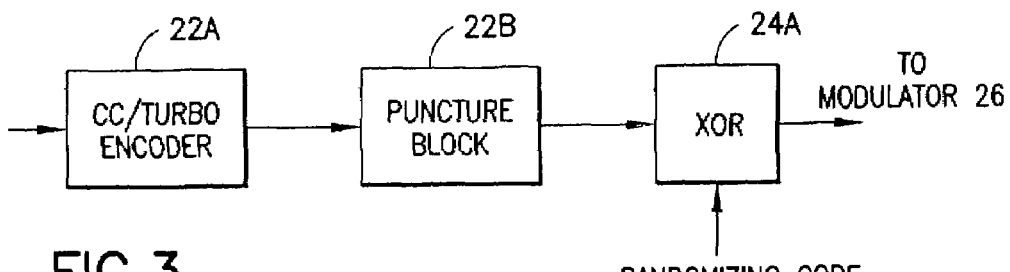
FIG.3

| PARAMETER | MODULATION AND CHANNEL CODING | | |
|---|---|---|---|
| | QPSK w/R=4/5 CODING (1.6 BITS/SYM) | 16-QAM w/R=4/5 CODING (3.2 BITS/SYM) | 64-QAM w/R=4/5 CODING (4.8 BITS/SYM) |
| RF CHANNEL BANDWIDTH | 3.5 MHz | 3.5 MHz | 3.5 MHz |
| CHIP RATE | 2.56 Mcps | 2.56 Mcps | 2.56 Mcps |
| COMMUNICATION CHANNEL BANDWIDTH | 4.096 Mbps | 8.192 Mbps | 12.288 Mbps |
| PEAK DATA RATE | 4.096 Mbps | 8.192 Mbps | 12.288 Mbps |
| CDMA CHANNEL BANDWIDTH (SF=1) | 4.096 Mbps | 8.192 Mbps | 12.288 Mbps |
| CDMA CHANNEL BANDWIDTH (SF=16) | 256 kbps | 512 kbps | 768 kbps |
| CDMA CHANNEL BANDWIDTH (SF=128) | 32 kbps | 64 kbps | 96 kbps |
| MODULATION FACTOR | 1.17 bps/Hz | 2.34 bps/Hz | 3.511 bps/Hz |

FIG.4  HYPOTHETICAL PARAMETERS FOR A 3.5 MHz RF CHANNELIZATION

| NUMBER OF ELEMENTS | QPSK | | 16 QAM | | 64 QAM | |
|---|---|---|---|---|---|---|
| | AGGREGATE CAPACITY (Mbps) | MODULATION FACTOR | AGGREGATE CAPACITY (Mbps) | MODULATION FACTOR | AGGREGATE CAPACITY (Mbps) | MODULATION FACTOR |
| 1 | 4.096 | 1.17 | 8.192 | 2.34 | 12.288 | 3.511 |
| 2 | 8.192 | 2.34 | 16.384 | 4.68 | 24.576 | 7.022 |
| 4 | 16.384 | 4.68 | 32.768 | 9.36 | 49.152 | 14.044 |
| 8 | 32.768 | 9.36 | 65.536 | 18.72 | 98.304 | 28.088 |
| 16 | 65.536 | 18.72 | 131.072 | 37.44 | 196.608 | 56.176 |

FIG.5 <u>AGGREGATE CAPACITY AND MODULATION FACTORS VERSUS MODULATION TYPE AND ARRAY SIZE</u>

$$H_4 = \begin{bmatrix} +1 & +1 & +1 & +1 \\ +1 & -1 & +1 & -1 \\ +1 & +1 & -1 & -1 \\ +1 & -1 & -1 & +1 \end{bmatrix} = \begin{bmatrix} h_1 \\ h_2 \\ h_3 \\ h_4 \end{bmatrix}$$

FIG. 6A $$H_{4\times 8} = \begin{bmatrix} +1 & +1 & +1 & +1 & +1 & +1 & +1 & +1 \\ +1 & +1 & -1 & -1 & +1 & +1 & -1 & -1 \\ +1 & +1 & +1 & +1 & -1 & -1 & -1 & -1 \\ +1 & +1 & -1 & -1 & -1 & -1 & +1 & +1 \end{bmatrix}$$

FIG. 6B $$H_{8\times 8} = \begin{bmatrix} +1 & +1 & +1 & +1 & +1 & +1 & +1 & +1 \\ +1 & -1 & +1 & -1 & +1 & -1 & +1 & -1 \\ +1 & +1 & -1 & -1 & +1 & +1 & -1 & -1 \\ +1 & -1 & -1 & +1 & +1 & +1 & -1 & +1 \\ +1 & +1 & +1 & +1 & -1 & -1 & -1 & -1 \\ +1 & -1 & +1 & -1 & -1 & +1 & -1 & +1 \\ +1 & +1 & -1 & -1 & -1 & -1 & +1 & +1 \\ +1 & -1 & -1 & +1 & -1 & +1 & +1 & -1 \end{bmatrix}$$

USE OF CHIP REPETITION TO PRODUCE A FLEXIBLE BANDWIDTH DS-CDMA SYSTEM

CLAIM OF PRIORITY FROM COPENDING PROVISIONAL PATENT APPLICATION

This patent application claims priority from U.S. Provisional Patent Application No.: 60/243,808, filed on Oct. 27, 2000, the disclosure of which is incorporated by reference herein in its entirety.

FIELD OF THE INVENTION

These teachings relate generally to wireless communications systems and methods, and relate in particular to techniques for varying the bandwidth of a transmission in a Direct Sequence Code Division Multiple Access (DS-CDMA) system.

BACKGROUND OF THE INVENTION

In a DS-CDMA system the users communicate simultaneously using the same frequency band via orthogonal modulation or spread spectrum. The bandwidth of conventional S-CDMA systems is determined by the chip rate and the pulse shape filtering that is used. Many of these systems also use a look-up table to store the pseudo-noise (PN) spreading codes in the transmitter and receiver. This is particularly true for those types of system using PN codes that are a power of two in length.

Conventional DS-CDMA system employ a single fixed chip rate, and thus exhibit a fixed bandwidth. This can create a problem when it is desired to produce a waveform that is required to have more than one bandwidth, and/or when it is desired to implement the CDMA system in different regions and markets having differing spectrum use and allocation regulations. For example, if in a particular region an operator is allocated a bandwidth of X, where the CDMA system requires a bandwidth of Y and where X<Y, then it may be impossible to operate the system.

SUMMARY OF THE INVENTION

In accordance with an aspect of these teachings there is described a technique for reducing the required signal bandwidth and the capacity of a DS-CDMA system without requiring hardware modifications. The inventive technique shapes the spectrum of the DS-CDMA system through the use of proper spreading code design, rather than modifying the chipping rate and spreading gain (chips/symbol). The spreading code design procedure involves providing a new code set by the use of chip repetition. Assuming that the spreading gain of the original DS-CDMA system is P chips/symbol, where P is a power of two, a new code set is constructed having P/N usable codes, each of length P where N is a power of two. The new code set is constructed from a base code set of size P/N×P/N, with each of the chips in the base code repeated to form the new P/N×P code set. By providing only P/N usable codes, the capacity of the new code set is reduced by a factor of N versus the original code set. However, it will be shown that the use of chip repetition reduces the number of chip transitions per symbol, thus reducing the required signal bandwidth of the new code set. Furthermore, since both the repetition code and original code have the same length in chips/symbol, modifications to the spreading/despreading circuitry of the DS-CDMA system are not required. The teachings of this invention apply to both synchronous and asynchronous DS-CDMA, with orthogonal designs being made possible for both cases.

A method is disclosed for obtaining a spreading code set for a code division multiple access communications system. The method includes (a) generating a P'×P' spreading code set where P'=P/N, where P is the spreading gain in chips/symbol and where N is an integer multiple of 2; and (b) replicating chips in each spreading code by N to produce a P'×P spreading code set. The step of generating may include randomizing the spreading code set by performing at least one or row or column permutation. The P'×P spreading code set is subsequently loaded into system hardware for operating the system hardware with a bandwidth that is less than the bandwidth that would be required to operate with the P'×P' Hadamard spreading code set.

These teachings further provide, in a synchronous, direct sequence code division multiple access communications system, a memory device that stores a spreading code set generated from a (P/N)×(P/N) Hadamard spreading code set, where P is the spreading gain in chips/symbol and N is an integer multiple of 2. The stored spreading code set is generated from the Hadamard spreading code set by repeating chips in each spreading code of the Hadamard spreading code set by a factor of N to produce a (P/N)×P spreading code set. The (P/N)×P spreading code set requires a channel bandwidth of Y Hz for operation, where Y<X and X is the channel bandwidth required for operation by the Hadamard code set.

One significant advantage provided by the novel code design technique is to allow an existing DS-CDMA system, originally designed for a particular bandwidth, to adjust to fit within a smaller bandwidth without requiring hardware modifications.

BRIEF DESCRIPTION OF THE DRAWINGS

The above set forth and other features of these teachings are made more apparent in the ensuing Detailed Description of the Preferred Embodiments when read in conjunction with the attached Drawings, wherein:

FIG. 1 is simplified block diagram of a wireless access reference model that pertains to these teachings;

FIG. 2 is block diagram of a physical (PHY) system reference model showing a major data flow path;

FIG. 3 shows an Error Control Coding (ECC) and scrambling technique for single CDMA channel;

FIG. 4 is a Table illustrating exemplary parameters for a 3.5 MHz RF channelization;

FIG. 5 is a Table depicting an aggregate capacity and modulation factors versus modulation type and antenna array size (number of elements);

FIG. 6A is an exemplary 4×4 Hadamard base code set;

FIG. 6B illustrates the use of chip repetition on the Hadamard matrix of FIG. 6A to produce a new 4×8 Hadamard code set;

FIG. 6C illustrates a normal 8×8 Hadamard code set;

DETAILED DESCRIPTION OF THE PREFERRED EMBODIMENTS

Figure 7A:
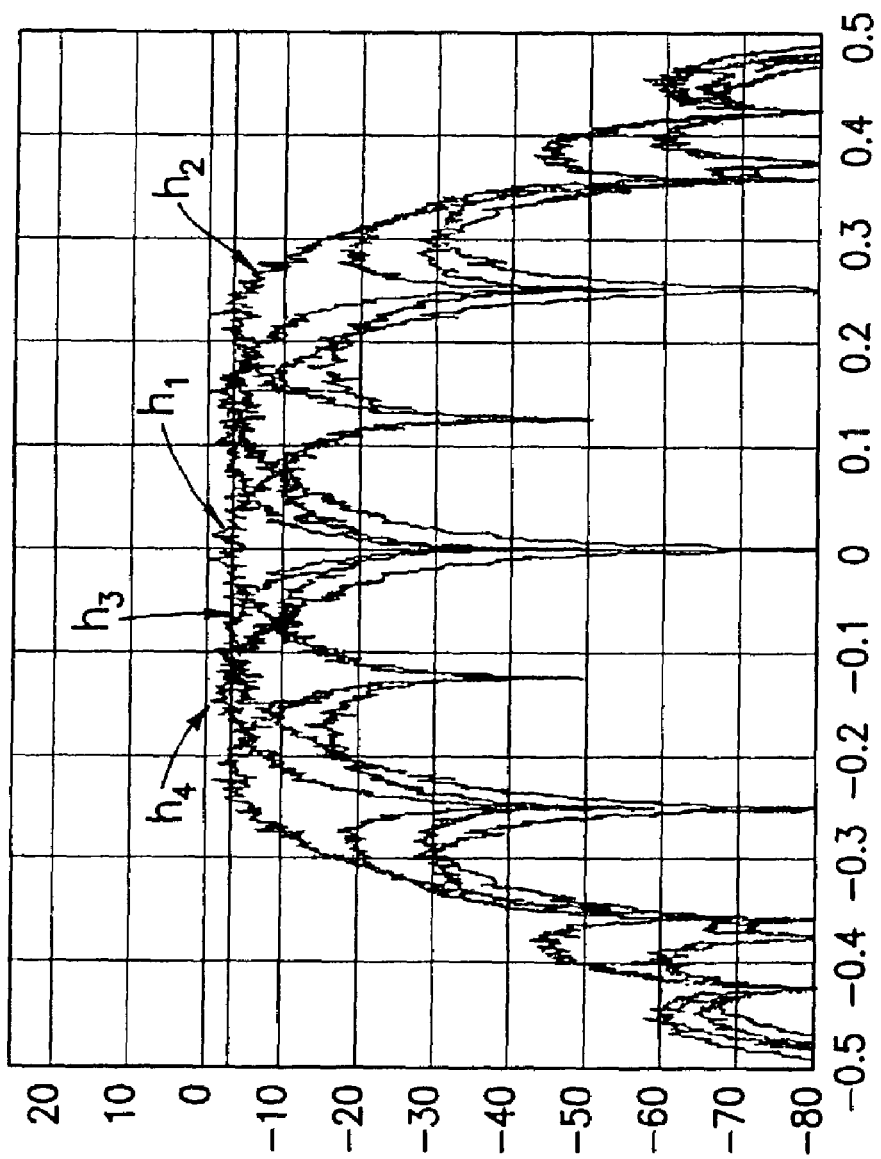
FIG. 7A is a graph depicting the power spectral density of a DS-CDMA system using $H_4$ with square root-raised cosine pulse shaping ($\beta$=0.35) and random data modulation.

Disclosed herein is a physical (PHY) system intended for IEEE 802.16 and related standards, although those having skill in the art should realize that various aspects of these teachings have wider applicability. The disclosed system is but one suitable embodiment for practicing these teachings.

The technique is based on a hybrid synchronous DS-CDMA (S-CDMA) and FDMA scheme using quadrature amplitude modulation (QAM) and trellis coding. For a general background and benefits of S-CDMA with trellis-coded QAM one may refer to R. De Gaudenzi, C. Elia and R. Viola, Bandlimited Quasi-Synchronous CDMA: A Novel Satellite Access Technique for Mobile and Personal Communication Systems, IEEE Journal on Selected Areas in Communications, Vol. 10, No. 2, February 1992, pp. 328–343, and to R. De Gaudenzi and F. Gianneti, Analysis and Performance Evaluation of Synchronous Trellis-Coded CDMA for Satellite Applications, IEEE Transactions on Communications, Vol. 43, No. 2/3/4, February/March/April 1995, pp. 1400–1409.

The ensuing description focuses on a frequency division duplexing (FDD) mode. While a time division duplexing (TDD) mode is also within the scope of these teachings, the TDD mode is not discussed further.

What follows is an overview of the PHY teachings that are useful in gaining a fuller understanding of these teachings.

The system provides synchronous direct-sequence code division multiple access (DS-CDMA) for both upstream and downstream transmissions. The system further provides spread RF channel bandwidths from 1.75–7 MHz, depending on target frequency band, and a constant chip rate from 1–6 Mcps (Million chips per second)within each RF sub-channel with common I-Q spreading. The chip rate depends on channelization of interest (e.g. 3.5 MHz or 6 MHz). The system features orthogonal, variable-length spreading codes using Walsh-Hadamard designs with spread factors (SF) of 1, 2, 4, 8, 16, 32, 64 and 128 chips/symbol being supported, and also features unique spreading code sets for adjacent, same-frequency cells/sectors. Upstream and downstream power control and upstream link timing control are provided, as are single CDMA channel data rates from 32 kbps up to 16 Mbps depending on SF (spreading factor) and chip rate. In the preferred system S-CDMA channel aggregation is provided for the highest data rates.

Furthermore, in the presently preferred embodiment FDMA is employed for large bandwidth allocations with S-CDMA in each FDMA sub-channel, and S-CDMA/FDMA channel aggregation is used for the higher data rates. Code, frequency and/or time division multiplexing is employed for both upstream and downstream transmissions. Frequency division duplex (FDD) or time division duplex (TDD) can be employed, although as stated above the TDD mode of operation is not described further. The system features coherent QPSK and 16-QAM modulation with optional support for 64-QAM. End-to-end raised-cosine Nyquist pulse shape filtering is employed, as is adaptive coding, using high-rate punctured, convolutional coding (K=7) and/ or Turbo coding (rates of ⅘, ⅚ and ⅞ are typical). Data randomization using spreading code sequences is employed, as is linear equalization in the downstream with possible transmit pre-equalization for the upstream.

As will be described more fully below, also featured is the use of space division multiple access (SDMA) using adaptive beam-forming antenna arrays (e.g., 1 to 16 elements) at the base station.

FIG. 1 shows the wireless access reference model per the IEEE 802.16 FRD (see IEEE 802.16.3-00/02r4, Functional Requirements for the 802.16.3 Interoperability Standard.). Within this model, the PHY technique in accordance with these teachings provides access between one or more subscriber stations (SS) 10 and base stations (BS) 11 to support the user equipment 12 and core network 14 interface requirements. An optional repeater 16 may be deployed. In the preferred embodiment the BS 11 includes a multi-element adaptive array antenna 11A, as will be described in detail below.

In FIG. 2, the PHY reference model is shown. This reference model is useful in discussing the various aspects of the PHY technique. As is apparent, the SS 10 and BS transmission and reception equipment may be symmetrical. In a transmitter 20 of the BS 11 or the SS 10 there is an Error Control Coding (ECC) encoder 22 for incoming data, followed by a scrambling block 24, a modulation block 26 and a pulse shaping/pre-equalization block 28. In a receiver 30 of the BS 11 or the SS 10 there is a matched filter/ equalization block 32, a demodulation block 34, a descrambling block 36 and an ECC decoder 38. These various components are discussed in further detail below.

The PHY interfaces with the Media Access Control (MAC) layer, carrying MAC packets and enabling MAC functions based on Quality of Service (QoS) requirements and Service Level Agreements (SLAs). As a S-CDMA system, the PHY interacts with the MAC for purposes of power and timing control. Both power and timing control originate from the BS 11, with feedback from the SS 10 needed for forward link power control. The PHY also interacts with the MAC for link adaptation (e.g. bandwidth allocation and SLAs), allowing adaptation of modulation formats, coding, data multiplexing, etc.

With regard to frequency bands and RF channel bandwidths, the primary frequency bands of interest for the PHY include the ETSI frequency bands from 1–3 GHz and 3–11 GHz as described in ETSI EN 301 055, Fixed Radio Systems; Point-to-multipoint equipment; Direct Sequence Code Division Multiple Access (DS-CDMA); Point-to-point digital radio in frequency bands in the range 1 GHz to 3 GHz, and in ETSI EN 301 124, Transmission and Multiplexing (TM); Digital Radio Relay Systems (DRRS); Direct Sequence Code Division Multiple Access (DS-CDMA) point-to-multipoint DRRS in frequency bands in the range 3 GHz to 11 GHz, as well as with the MMDS/MDS (digital TV) frequency bands. In ETSI EN 301 124, the radio specifications for DS-CDMA systems in the fixed frequency bands around 1.5, 2.2, 2.4 and 2.6 GHz are given, allowing channelizations of 3.5, 7, 10.5 and 14 MHz. Here, the Frequency Division Duplex (FDD) separation is specific to the center frequency and ranges from 54 to 175 MHz. In ETSI EN 301 124, Transmission and Multiplexing (TM); Digital Radio Relay Systems (DRRS); Direct Sequence Code Division Multiple Access (DS-CDMA) point-to-multipoint DRRS in frequency bands in the range 3 GHz to 11 GHz., the radio characteristics of DS-CDMA systems with fixed frequency bands centered around 3.5, 3.7 and 10.2 GHz are specified, allowing channelizations of 3.5, 7, 14, 5, 10 and 15 MHz. Here, FDD separation is frequency band dependant and ranges from 50 to 200 MHz. Also of interest to these teachings are the MMDS/ITSF frequency bands between 2.5 and 2.7 GHz with 6 MHz channelizations.

With regard to multiple access, duplexing and multiplexing, the teachings herein provide a frequency division duplex (FDD) PHY using a hybrid S-CDMA/FDMA multiple access scheme with SDMA for increased spectral efficiency. In this approach a FDMA sub-channel has an RF channel bandwidth from 1.75 to 7 MHz. The choice of FDMA sub-channel RF channel bandwidth is dependent on the frequency band of interest, with 3.5 MHz and 6 MHz being typical per the IEEE 802.16 FRD. Within each FDMA sub-channel, S-CDMA is used with those users transmitting in the upstream and downstream using a constant chipping rate from 1 to 6 Mchips/second. While TDD could be used in a single RF sub-channel, this discussion is focused on the FDD mode of operation. Here, FDMA sub-channel(s) are used in the downstream while at least one FDMA sub-channel is required for the upstream. The approach is flexible to asymmetric data traffic, allowing more downstream FDMA sub-channels than upstream FDMA sub-channels when traffic patterns and frequency allocation warrant. Based on existing frequency bands, typical upstream/downstream FDMA channel separation range from 50 to 200 MHz.

Turning now to the Synchronous DS-CDMA (S-DS/CDMA) aspects of these teachings, within each FDMA sub-channel, S-CDMA is used in both the upstream and the downstream directions. The chipping rate is constant for all SS with rates ranging from 1 to 6 Mchips/second depending on the FDMA RF channel bandwidth. Common I-Q spreading is performed using orthogonal, variable-length spreading codes based on Walsh-Hadamard designs, with spread factors ranging from 1 up to 128 chips per symbol (see, for example, E. Dinan and G. Jabbari, Spreading Codes for Direct Sequence CDMA and Wideband CDMA Cellular Networks, IEEE Communications Magazine, September 1998, pp. 48–54. Formulti-cell deployments with low frequency reuse, unique spreading code sets are used in adjacent cells to minimize interference.

An aspect of the preferred system embodiment is a symmetric waveform within each FDMA sub-channel, where both the upstream and downstream utilize the same chipping rate (and RF channel bandwidth), spreading code sets, modulation, channel coding, pulse shape filtering, etc.

Referring now to Code and Time Division Multiplexing and channel aggregation, with a hybrid S-CDMA/FDMA system it is possible to multiplex data over codes and frequency sub-channels. Furthermore, for a given code or frequency channel, time division multiplexing could also be employed. In the preferred approach, the following multiplexing scheme is employed.

For the downstream transmission with a single FDMA sub-channel, the channel bandwidth (i.e. capacity measured in bits/second) is partitioned into a single TDM pipe and multiple CDM pipes. The TDM pipe may be created via the aggregation of multiple S-CDMA channels. The purpose of this partition is based on the desire to provide Quality of Service (QoS). Within the bandwidth partition, the TDM pipe would be used for best effort service (BES) and for some assured forwarding (AF) traffic. The CDM channels would be used for expedited forwarding (EF) services, such as VoIP connections or other stream applications, where the data rate of the CDM channel is matched to the bandwidth requirement of the service.

The downlink could be configured as a single TDM pipe. In this case a time slot assignment may be employed for bandwidth reservation, with typical slot sizes ranging from 4–16 ms in length. While a pure TDM downlink is possible in this approach, it is preferred instead to employ a mixed TDM/CDM approach. This is so because long packets can induce jitter into EF services in a pure TDM link. Having CDMA channels (single or aggregated) dedicated to a single EF service (or user) reduces jitter without the need for packet fragmentation and reassembly. Furthermore, these essentially circuit-switched CDM channels would enable better support of legacy circuit-switched voice communications equipment and public switched telephone networks.

For the upstream, the preferred embodiment employs a similar partition of TDM/CDM channels. The TDM channel(s) are used for random access, using a slotted-Aloha protocol. In keeping with a symmetric waveform, recommended burst lengths are on the order of the slot times for the downlink, ranging from 4–16 ms. Multi-slot bursts are possible. The BS 11 monitors bursts from the SS 10 and allocates CDMA channels to SSs upon recognition of impending bandwidth requirements or based on service level agreements (SLAs). As an example, a BS 11 recognizing the initiation of a VoIP connection could move the transmission to a dedicated CDMA channel with a channel bandwidth of 32 kbps.

When multiple FDMA sub-channels are present in the upstream or downstream directions, similar partitioning could be used. Here, additional bandwidth exists that implies that more channel aggregation is possible. With a single TDM channel, data may be multiplexed across CDMA codes and across frequency sub-channels.

With regard now to Space Division Multiple Access (SDMA) extensions, a further aspect of this multiple access scheme involves the use of SDMA using adaptive beamforming antennas. Reference can be made to J. Liberti and T. Rappaport, *Smart Antennas for Wireless CDMA*, Prentice-Hall PTR, Upper Saddle River, N.J., 1997, for details of beamforming with CDMA systems.

In the preferred embodiment the adaptive antenna array 11A at the BS 11 is provided with fixed beam SS antennas. In this approach the S-CDMA/FDMA channels can be directed at individual SSs. The isolation provided by the beamforming allows the CDMA spreading codes to be reused within the same cell, greatly increasing spectral efficiency. Beamforming is best suited to CDM rather than TDM channels. In the downstream, TDM would employ beamforming on a per slot or burst basis, increasing complexity. In the upstream, beamforming would be difficult since the BS 11 would need to anticipate transmission from the SS in order to form the beams appropriately. In either case, reuse of CDMA spreading codes in a TDM-only environment would be difficult. With CDM, however, the BS 11 may allocate bandwidth (i.e. CDMA channels) to the SS 10 based on need, or on SLAs. Once allocated, the BS 11 forms abeam to the SS 10 to maximize signal-to-interference ratios. Once the beam is formed, the BS 11 may allocate the same CDMA channel to one or more other SSs 10 in the cell. It is theoretically possible for the spectral efficiency of the cell to scale linearly with the number of antennas in the BS array 11A.

SDMA greatly favors the approach of fast circuit-switching over pure, TDM packet-switching in a CDMA environment. By fast circuit-switching, what is implied is that packet data services are handled using dedicated connections, which are allocated and terminated based on bandwidth requirements and/or SLAs. An important consideration when providing effective packet-services using this approach lies in the ability of the BS 11 to rapidly determine bandwidth needs, and to both allocate and terminate connections rapidly. With fast channel allocation and termination, SDMA combined with the low frequency reuse offered by S-CDMA is a preferred option, in terms of spectral efficiency, for FWA applications.

A discussion is now made of waveform specifications. The waveform includes the channel coding 22, scrambling 24, modulation 26 and pulse shaping and equalization functions 28 of the air interface, as depicted in FIG. 2. Also included are waveform control functions, including power and timing control. In the presently preferred PHY, each CDMA channel (i.e. spreading code) uses a common waveform, with the spreading factor dictating the data rate of the channel.

With regard to the Error Control Coding (ECC) function 22 of FIG. 2, the ECC is preferably high-rate and adaptive. High rate codes are used to maximize the spectral efficiency of BWA systems using S-CDMA systems that are code-limited. In code-limited systems, the capacity is limited by the code set cardinality rather than the level of the multi-user interference. Adaptive coding is preferred in order to improve performance in multipath fading environments. For the coding options, and referring as well to FIG. 3, the baseline code is preferably a punctured convolutional code (CC). The constituent code may be the industry standard, rate ½, constraint length 7 code with generator $(133/171)_8$. Puncturing is used to increase the rate of the code, with rates of ¾, ⅘, ⅚ or ⅞ supported using optimum free distance puncturing patterns. The puncturing rate of the code may be adaptive to mitigate fading conditions. For decoding (block 38 of FIG. 2), a Viterbi decoder is preferred. Reference in this regard can be made again to the above-noted publication R. De Gaudenzi and F. Gianneti, Analysis and Performance Evaluation of Synchronous Trellis-Coded CDMA for Satellite Applications, IEEE Transactions on Communications, Vol. 43, No. 2/3/4, February/March/April 1995, pp. 1400–1409, for an analysis of trellis-coded S-CDMA.

Turbo coding, including block turbo codes and traditional parallel and serial concatenated convolutional codes, are preferably supported as an option at the rates suggested above. In FIG. 3, the CC/Turbo coding is performed in block 22A, the puncturing in block 22B, and the scrambling can be performed using an XOR 24A that receives a randomizing code.

Each CDMA channel is preferably coded independently. Independent coding of CDMA channels furthers the symmetry of the upstream and downstream waveform and enables a similar time-slot structure on each CDMA channel. The upstream and downstream waveform symmetry aids in cost reduction, as the SS 10 and BS 11 baseband hardware can be identical. The independent coding of each S-CDMA/FDMA channel is an important distinction between this approach and other multi-carrier CDMA schemes.

Randomization is preferably implemented on the coded bit stream. Rather than using a traditional randomizing circuit, it is preferred, as shown in FIG. 3, to use randomizing codes derived from the spreading sequences used by the transmitting station. Using the spreading codes allows different randomizing sequences to be used by different users, providing more robust randomization and eliminating problems with inter-user correlated data due to periodic sequences transmitted (e.g. preambles). Since the receiving station has knowledge of the spreading codes, de-randomization is trivial. Randomization may be disabled on a per channel or per symbol basis. FIG. 3 thus depicts the preferred channel coding and scrambling method for a single CDMA channel.

With regard to the modulation block 26, both coherent QPSK and square 16-QAM modulation formats are preferably supported, with optional support for square 64-QAM. Using a binary channel coding technique, Gray-mapping is used for constellation bit-labeling to achieve optimum decoded performance. This combined coding and modulation scheme allows simple Viterbi decoding hardware designed for binary codes to be used. Differential detection for all modulation formats may be supported as an option. Depending on the channel coding, waveform spectral efficiencies from 1 to 6 information bits/symbol are realized.

The modulation format utilized is preferably adaptive based on the channel conditions and bandwidth requirements. Both upstream and downstream links are achievable using QPSK waveform provided adequate SNR. In environments with higher SNR, up and downstream links may utilize 16-QAM and/or 64-QAM modulation formats for increased capacity and spectral efficiency. The allowable modulation format depends on the channel conditions and the channel coding being employed on the link.

In the preferred embodiment, end-to-end raised-cosine Nyquist pulse shaping is applied by block 28 of FIG. 2, using a minimum roll-off factor of 0.25. Pulse shape filtering is designed to meet relevant spectral masks, mitigate inter-symbol interference (ISI) and adjacent FDMA channel interference.

To mitigate multipath fading, a linear equalizer 32 is preferred for the downstream. Equalizer training may be accomplished using a preamble, with decision-direction used following initial training. With S-CDMA, equalizing the aggregate signal in the downlink effectively equalizes all CDMA channels. Multipath delay spread of less than 3 µs is expected for Non-Line Of Sight (NLOS) deployments using narrow-beam (10–20°) subscriber station 10 antennas (see, for example, J. Porter and J. Thweat, Microwave Propagation Characteristics in the MMDS Frequency Band, Proceedings of IEEE International Conf. On Communications (ICC) 2000, New Orleans, La., USA, June 2000, and V. Erceg, et al, A Model for the Multipath Delay Profile of Fixed Wireless Channels, IEEE Journal on Selected Areas in Communications (JSAC), Vol. 17, No. 3, March 1999, pp. 399–410.

The low delay spread allows simple, linear equalizers with 8–16 taps that effectively equalize most channels. For the upstream, pre-equalization may be used as an option, but requires feedback from the subscriber station 10 due to frequency division duplexing.

Timing control is required for S-CDMA. In the downstream, timing control is trivial. However, in the upstream timing control is under the direction of the BS 11. Timing control results in reduced in-cell interference levels. While infinite in-cell signal to interference ratios are theoretically possible, timing errors and reduction in code-orthogonality from pulse shape filtering allows realistic signal to in-cell interference ratios from 30–40 dB. In asynchronous DS-CDMA (A-CDMA) systems, higher in-cell interference levels exist, less out-of-cell interference can be tolerated and higher frequency reuse is needed to mitigate out-of-cell interference (see, for example, T. Rappaport, *Wireless Communications: Principles and Practice*, Prentice-Hall PTR, Upper Saddle River, N.J., 1996, pp. 425–431. The ability of timing-control to limit in-cell interference is an important aspect of achieving a frequency reuse of one in a S-CDMA system.

Power control is also required for S-CDMA systems. Power control acts to mitigate in-cell and out-of-cell interference while also ensuring appropriate signal levels at the SS 10 or the BS 11 to meet bit error rate (BER) requirements. For a SS 10 close to the BS 11, less transmitted power is required, while for a distant SS 10, more transmit power is required in both the up and downstream. As with timing control, power control is an important aspect of achieving a frequency reuse of one.

Turning now to a discussion of capacity, spectral efficiency and data rates, for a single, spread FDMA channel, the presently preferred S-CDMA waveform is capable of providing channel bandwidths from 1 to 16 Mbps. Using variable-length spreading codes, each CDMA channel can be configured to operate from 32 kbps (SF=128) to 16 Mbps (SF=1), with rates depending on the modulation, coding and RF channel bandwidths. With S-CDMA channel aggregation, high data rates are possible without requiring a SF of one. In general, the use of S-CDMA along with the presently preferred interference mitigation techniques enable the system to be code-limited. Note should be made that mobile cellular A-CDMA systems are always interference-limited, resulting in lower spectral efficiency. Recall also that in code-limited systems, the capacity is limited by the code set cardinality rather than the level of the multi-user interference. In a code-limited environment, the communications channel bandwidth of the system is equal to the communications channel bandwidth of the waveform, assuming a SF of one. In the Table shown in FIG. 4 sample parameters are shown for a hypothetical system using different coded modulation schemes and assuming a code-limited DS-CDMA environment. The Table of FIG. 4 illustrates potential performance assuming a single 3.5 MHz channel in both the upstream and downstream. The numbers reported apply to both the upstream and downstream directions, meaning that upwards of 24 Mbps full duplex is possible (12 Mbps upstream and 12 Mbps downstream). With additional FDMA RF channels or large RF channels (e.g., 6 MHz), additional communication bandwidth is possible with the same modulation factors from the Table. As an example, allocation of 14 MHz could be serviced using 4 FDMA RF channels with the parameters described in the Table of FIG. 4. At 14 MHz, peak data rates to a given SS 10 of up to 48 Mbps are achievable, with per-CDMA channel data rates scaling up from 32 kbps. The channel aggregation method in accordance with these teachings is very flexible in servicing symmetric versus asymmetric traffic, as well as for providing reserved bandwidth for QoS and SLA support.

With regard to multi-cell performance, to this point both the capacity and spectral efficiency have been discussed in the context of a single, isolated cell. In a multi-cell deployment, S-CDMA enables a true frequency reuse of one. With S-CDMA, there is no need for frequency planning, and spectral efficiency is maximized. With a frequency reuse of one, the total system spectral efficiency is equal to the modulation factor of a given cell. Comparing S-CDMA to a single carrier TDMA approach, with a typical frequency reuse of 4, TDMA systems must achieve much higher modulation factors in order to compete in terms of overall system spectral efficiency. Assuming no sectorization and a frequency reuse of one, S-CDMA systems can achieve system spectral efficiencies from 1 to 6 bps/Hz, with improvements being possible with SDMA.

While frequency reuse of one is theoretically possible for DS-CDMA, the true allowable reuse of a specific deployment is dependent on the propagation environment (path loss) and user distribution. For mobile cellular systems, it has been shown that realistic reuse factors range from 0.3 up to 0.7 for A-CDMA: factors that are still much higher than for TDMA systems. In a S-CDMA system, in-cell interference is mitigated by the orthogonal nature of the S-CDMA, implying that the dominant interference results from adjacent cells. For the fixed environments using S-CDMA, true frequency reuse of one can be achieved for most deployments using directional SS 10 antennas and up and downstream power control to mitigate levels of adjacent cell interference. In a S-CDMA environment, true frequency reuse of one implies that a cell is code-limited, even in the presence of adjacent cell interference.

For sectorized deployments with S-CDMA, a frequency reuse of two is preferred to mitigate the interference contributed by users on sector boundaries. In light of this reuse issue, it is preferred, but not required, to use SDMA with adaptive beamforming, rather than sectorization, to improve cell capacity. Since spectral efficiency translates directly into cost, the possibility of a frequency reuse of one is an important consideration.

The use of SDMA in conjunction with S-CDMA offers the ability to dramatically increase system capacity and spectral efficiency. SDMA uses the antenna array 11A at the BS 11 to spatially isolate same code SSs 10 in the cell. The number of times that a code may be reused within the same cell is dependent upon the number of antenna elements in the array 11A, the array geometry, the distribution of users in the cell, the stability of the channel, and the available processing power. Theoretically, in the absence of noise, with an M element antenna array 11A it is possible to reuse each code sequence M times, thereby increasing system capacity by a factor of M. In practice, the code reuse is slightly less than M due to implementation loss, frequency selective multipath fading, and receiver noise. Regardless, significant capacity gains are achievable with SDMA. With appropriate array geometry and careful grouping of users sharing CDMA codes, it is possible to achieve a code reuse of 0.9M or better.

In an actual deployment the number of antenna elements of the antenna array 11A is limited by the available processing power, the physical tower constraints and by system cost (e.g. the number of additional RF front ends (RFFEs)). Selected array sizes vary depending upon the required capacity of the given cell on a cell-by-cell basis. The Table shown in FIG. 5 illustrates the achievable aggregate capacity and modulation factor with typical array sizes, assuming a code reuse equal to the number of antenna elements. The aggregate capacity is defined as the total data rate of the BS 11. Modulation factors exceeding 56 bps/Hz are achievable with 64 QAM and a sixteen-element antenna array 11A. It should be noted that while SDMA increases the capacity of cell, it does not increase the peak data rate to a given SS 10.

The PHY system disclosed herein is very flexible. Using narrowband S-CDMA channels, the PHY system can adapt to frequency allocation, easily handling non-contiguous frequency allocations. The data multiplexing scheme allows great flexibility in servicing traffic asymmetry and support of traffic patterns created by higher-layer protocols such as TCP.

Deployments using the disclosed PHY are also very scalable. When traffic demands increase, new frequency allocation can be used. This involves adding additional FDMA channels, which may or may not be contiguous with the original allocation. Without additional frequency allocation, cell capacity can be increased using the adaptive antenna array 11A and SDMA.

The high spectral efficiency of the disclosed waveform leads to cost benefits. High spectral efficiency implies less frequency bandwidth is required to provide a certain amount of capacity.

Using a symmetric waveform (i.e., a waveform that is the same in the upstream and downstream directions) is a cost saving feature, allowing the use of common baseband hardware in the SS 10 and the BS 11. The use of CDMA technology also aids in cost reduction, as some CDMA technology developed for mobile cellular applications may be applicable to gain economies of scale.

As a spread spectrum signal, the preferred waveform offers inherent robustness to interference sources. Interference sources are reduced by the spreading factor, which ranges from 1 to 128 (interference suppression of 0 to 21 dB.) At the SS 10, equalization further suppresses narrow-band jammers by adaptively placing spectral nulls at the jammer frequency. Additional robustness to interference is achieved by the directionality of the SS antennas, since off-boresight interference sources are attenuated by the antenna pattern in the corresponding direction. At the BS 11, the antenna array 11A used to implement SDMA offers the additional benefit of adaptively steering nulls towards unwanted interference sources.

The presently preferred waveform exhibits several properties that make it robust to channel impairments. The use of spread spectrum makes the waveform robust to frequency selective fading channels through the inherent suppression of inter-chip interference. Further suppression of inter-chip interference is provided by equalization at the SS 10. The waveform is also robust to flat fading channel impairments. The adaptive channel coding provides several dB of coding gain. The antenna array 11A used to implement SDMA also functions as a diversity combiner. Assuming independent fading on each antenna element, diversity gains of M are achieved, where M is equal to the number of antenna elements in the antenna array 11A. Finally, since the S-CDMA system is code-limited rather than interference limited, the system may run with a large amount of fade margin. Even without equalization or diversity, fade margins on the order of 10 dB are possible. Therefore, multipath fades of 10 dB or less do not increase the BER beyond the required level.

The adaptive modulation also provides some robustness to radio impairments. For receivers with larger phase noise, the QPSK modulation offers more tolerance to receiver phase noise and filter group delay. The adaptive equalizer at the SS 10 reduces the impact of linear radio impairments. Finally, the use of clipping to reduce the peak-to-average power ratio of the transmitter signal helps to avoid amplifier saturation, for a given average power output.

An important distinction between the presently preferred embodiment and a number of other CDMA approaches is the use of a synchronous upstream, which allows the frequency reuse of one. Due to some similarity with mobile cellular standards, cost savings are possible using existing, low-cost CDMA components and test equipment.

The presently preferred PHY is quite different from cable modem and xDSL industry standards, as well as existing IEEE 802.11 standards. With a spreading factor of one chip/symbol, the PHY supports a single-carrier QAM waveform similar to DOCSIS 1.1 and IEEE 802.16.1 draft PHY (see Data-Over-Cable Service Interface Specifications: Radio Frequency Interface Specification, SP-RF1v1.1-I05-000714, and IEEE 802.16.1-00/01r4, Air Interface for Fixed Broadband Wireless Access Systems, September 2000.)

The presently preferred PHY technique provides an optimum choice for IEEE 802.16A and for other applications. An important aspect of the PHY is its spectral efficiency, as this translates directly to cost measured in cost per line or cost per carried bit for FWA systems. With a frequency reuse of one and efficient support of SDMA for increased spectral efficiency, the combination of S-CDMA with FDMA is an optimum technology for the fixed wireless access market.

Benefits of the presently preferred PHY system include:
High spectral efficiency (1–6 bps/Hz system-wide), even without SDMA;
Compatibility with smart antennas (SDMA), with system-wide spectral efficiency exceeding 20 bps/Hz possible; and
A frequency reuse of one is possible (increased spectral efficiency and no frequency planning).

The use of S-CDMA provides robustness to channel impairments (e.g. multipath fading): robustness to co-channel interference (allows frequency reuse of one); and security from eavesdropping.

Also provided is bandwidth flexibility and efficiency support of QoS requirements, flexibility to support any frequency allocation using a combination of narrowband S-CDMA combined with FDMA, while adaptive coding and modulation yield robustness to channel impairments and traffic asymmetries.

The use of these teachings also enables one to leverage mobile cellular technology for reduced cost and rapid technology development and test. Furthermore, cost savings are realized using the symmetric waveform and identical SS 10 and BS 11 hardware.

Having thus described the overall PHY system, a discussion will now be provided in greater detail of an aspect thereof that is particularly pertinent to these teachings.

It is first noted that the occupied signal bandwidth of a DS-CDMA system is determined by the chipping rate $R_{chip}$, the pulse shape filtering and the spectral properties of the spreading codes. The following discussion assumes a fixed chipping rate, and the spectral properties of the spreading codes are examined assuming an adjustable Finite Impulse Response (FIR) pulse shape filter. For a given spreading code, the number and frequency of chip transitions determines the spectrum of the code. To illustrate this, and referring to FIG. 6, consider a 4×4 Hadamard code set with spreading factor of P=4 chips/symbol, where $h_1$ is a 1×P spreading code vector.

When each of the spreading codes modulates a random binary data stream, the resulting signals have very different occupied signal bandwidths. Data spread using $h_1$=[+1 +1 +1 +1] results in a signal having an occupied bandwidth equal to the bandwidth of the data modulation, or in this case $R_{chip}/4$. Spreading with spreading codes $h_3$=[+1 +1 −1 −1] or $h_4$=[+1 −1 −1 +1] results in a spectrum having bandwidth roughly equal to $R_{chip}/2$, since there are exactly two transitions per chip sequence. The use of the spreading code $h_2$=[+1 −1 +1 −1] results in the largest occupied bandwidth signal, as there can be four transitions per spreading code.

The graph of FIG. 7A shows the power spectral density of the four PN codes with random antipodal data modulation (e.g., BPSK) with square root-raised cosine pulse shaping (β=0.35) and random data modulation. As can be seen, the resulting 3-dB bandwidth of the signal is directly related to the number of transitions per code sequence. In FIG. 7A it can be see that the occupied signal bandwidth is conditioned on which spreading code is used. When all four codes are used, the occupied signal bandwidth of this exemplary system is roughly equal to the chip rate. However, if the spreading code $h_2$ is not used, the capacity of the system reduces to three users, while the occupied signal bandwidth drops to Rchip/2. In this example it can be seen that by not using the large bandwidth code ($h_2$) results in a reduction in both the system capacity and the required bandwidth, without hardware modifications.

If the Hadamard set is the base code set for the DS-CDMA system, eliminating the use of the high-bandwidth codes is an attractive technique for flexibly balancing bandwidth and capacity. However, DS-CDMA systems commonly use code sets constructed from randomized Hadamard matrices that may be scrambled using scrambling codes. Code sets constructed in this manner typically have a single code with low bandwidth (all one's code), while the other P-1 spreading codes have roughly P/2 transitions and thus require a bandwidth of roughly $R_{chip}$. The technique of eliminating the high-bandwidth codes thus is not effective in this case since P-1 codes have roughly the same occupied signal bandwidth.

It has been shown that the technique of eliminating the high-bandwidth codes is not an attractive option, except for the Hadamard set. As such, an alternative technique based on chip repetition is now described. Assume a DS-CDMA system with spreading gain P chips/symbol and chip rate $R_{chip}$, where P is a power of two. The goal is to design a spreading code set having P/N spreading codes with P chips/symbol having spectral properties such that the occupied signal bandwidth of the system is $R_{chip}/N$. It is preferred that N be a multiple of two to ensure that the length of the new code set is P. To design the new code set, a (P/N×P/N) base code set is constructed, which could be a Hadamard or randomized Hadamard design. Each chip in the base code set is repeated N times to construct the new code set of size P/N×P. Since each chip is replicated or repeated N times, each 1×P spreading code is guaranteed to have no more than P/N equally-spaced transitions, and thus a bandwidth less than or equal to $R_{chip}/N$. Furthermore, if the base code set is an orthogonal design (i.e. all codewords are orthogonal), the orthogonality is preserved during an over-sampling process. This can be shown as follows: if a scrambling code were to be applied to the system, it too must be over-sampled by N in order to maintain the bandwidth reduction of 1/N. Since the spreading codes in the new code set are the same length in chips per symbol as the original spreading codes, the bandwidth and the user capacity are both reduced, without hardware modifications in the chip spreader/despreader circuitry.

For the purposes of this invention, a chip is considered to be the most fundamental component of the system modulation waveform.

As an example, consider a DS-CDMA system operating with a chip rate $R_{chip}$=2.72 Mcps using a spreading code set with spread factor eight chips/symbol. With normal Hadamard or randomized Hadamard construction of the 8×8 spreading code set ($H_{8\times 8}$), the nominal RF signal bandwidth of the system would be approximately 2.72 MHz. Here, the system supports eight CDMA channels with an information symbol rate of 340 ksps (thousand symbols per second) per channel. If it were desired for the system to operate with a signal bandwidth below 1.75 MHz, chip repetition in accordance with this invention maybe used with P=8 and N=2, yielding a reduced capacity of four CDMA channels at 340 ksps. To design a code set having half the capacity but requiring half the RF bandwidth, a new code set is designed based on chip repetition and N=2. A 4×4 Hadamard set, as shown in the example of FIG. 6A, is used as the base code set.

From the base code set, each chip is repeated twice (N=2), to produce the new 4×8 set ($H_{4\times 8}$) shown in FIG. 6B.

Figure 7B:
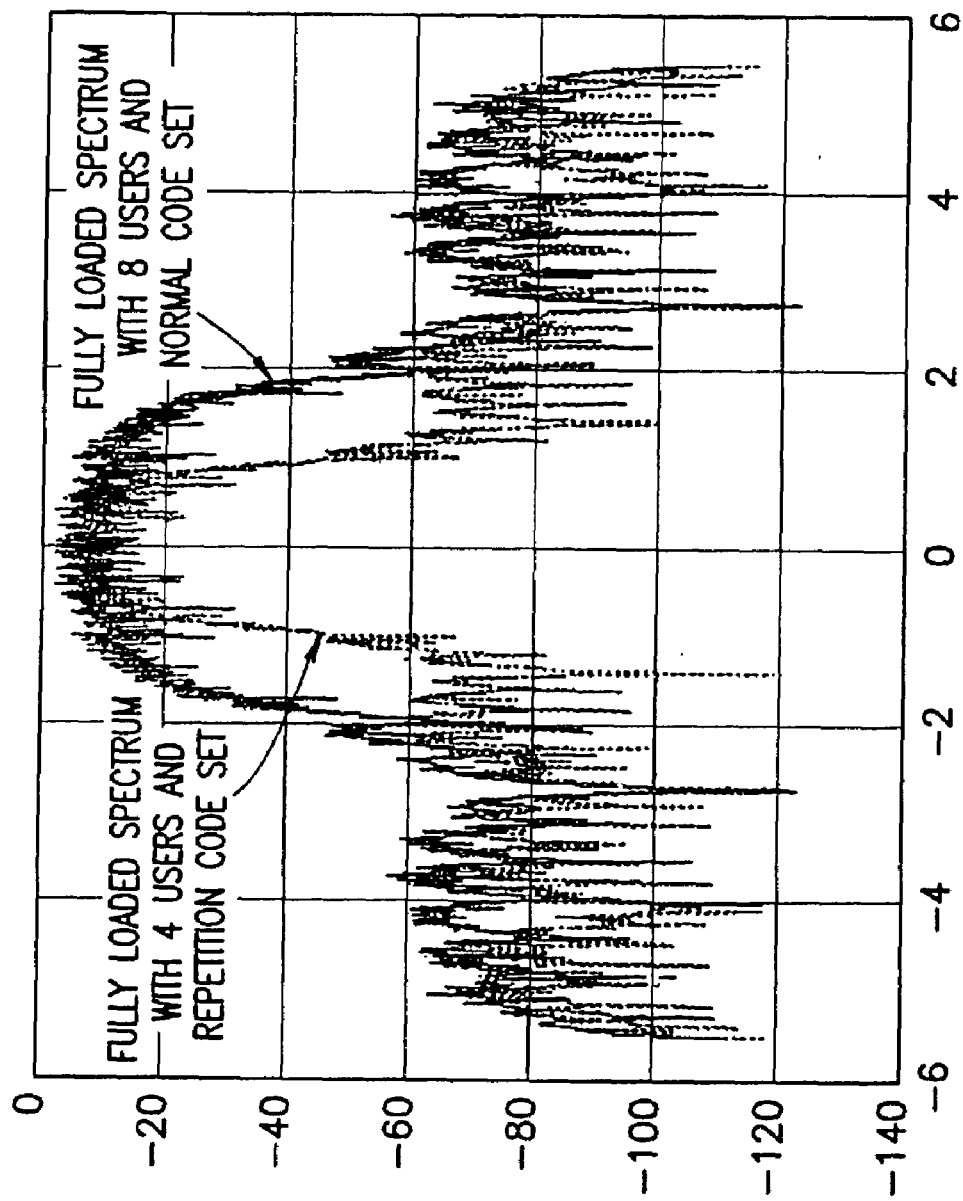
FIG. 7B is a graph depicting the power spectral density of a DS-CDMA system for the case of $R_{chip}$=2.72 Mcps and square root-raised cosine pulse shaping ($\beta$=0.35) using the 8×8 Hadamard code set of FIG. 6C and the 4×8 repetition code of FIG. 6B, based on the 4×4 Hadamard base set of FIG. 6A.

Compared to the DS-CDMA system using a normal 8×8 Hadamard set as shown in FIG. 6C, utilizing the chip repetition code set allows operation with the same spreading factor measured in chips per symbol, but half the available codes (capacity) and half the required signal bandwidth. This signal bandwidth relation of the systems using $H_{8\times 8}$ and $H_{4\times 8}$ is illustrated in the plots of FIG. 7B, which shows the power spectral densities of the two systems using random, antipodal signaling with a square root-raised cosine pulse shape. As can be seen, the system with half the capacity (4 CDMA channels versus 8) occupies half the RF signal bandwidth. Thus, the capacity and required RF signal bandwidth of the DS-CDMA system have been effectively scaled, without hardware modifications, by the use of a different spreading code set having the same spreading factor but fewer available operating codes.

Figure 8:
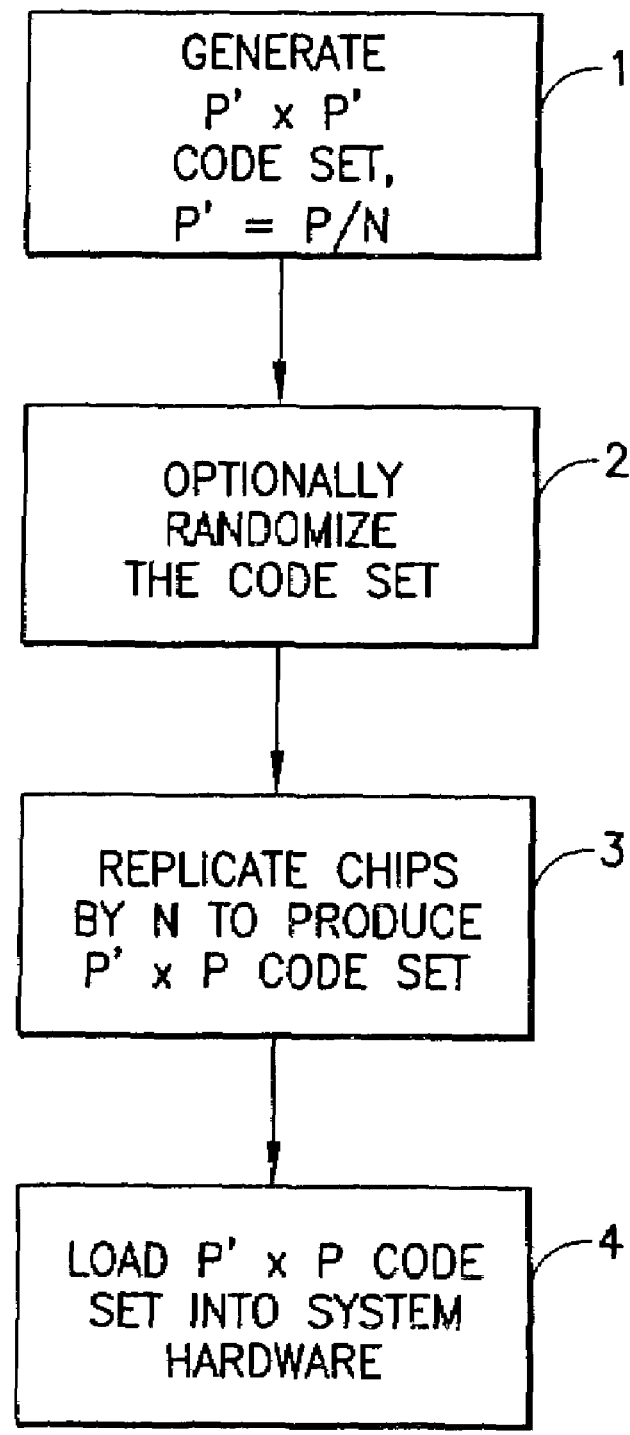
FIG. 8 is a logic flow diagram that illustrates a method in accordance with the teachings of this invention.

To reduce the capacity and required signal bandwidth by a factor N of a DS-CDMA system with processing gain P, where P and N are powers of two, the steps shown in FIG. 8 are executed, as follows:

1. Generate a P'×P' Hadamard code set where P'=P/N

2. Randomize (optional) the Hadamard code set (row and/or column permutation)

3. Replicate chips in each code by N to produce a P'×P code matrix

4. Load the new spreading matrix into the system hardware.

An important motivation for designing code sets with reduced bandwidth is to provide frequency flexibility for enabling different deployments of a DS-CDMA system to be made. More specifically, being designed with a given chipping rate, most DS-CDMA systems are tailored for a particular frequency plan. For example, Wideband CDMA (W-CDMA) cellular systems use a chip rate of 4.096 Mcps and are designed for a 5 MHz channel. Another type of CDMA system uses a chipping rate of 2.72 Mcps and is designed for a 3.5 MHz channel. In some cases, systems designed for one channel spacing are required to fit into a different channel spacing which as been standardized in a given region. As an example, suppose that a W-CDMA system designed for a 5 MHz channel plan was required to operate in an ETSI 3.5 MHz channel plan. However, through the use of the teachings of this invention a new spreading code set based on chip repetition with N=2 could be used to allow the 5 MHz system to become a 2.5 MHz system in order to fit within the 3.5 MHz channel plan. In scaling from 5 to 2.5 MHz, there could be a loss in capacity, but the waveform would comply with the specified channelization.

Figure 7C:
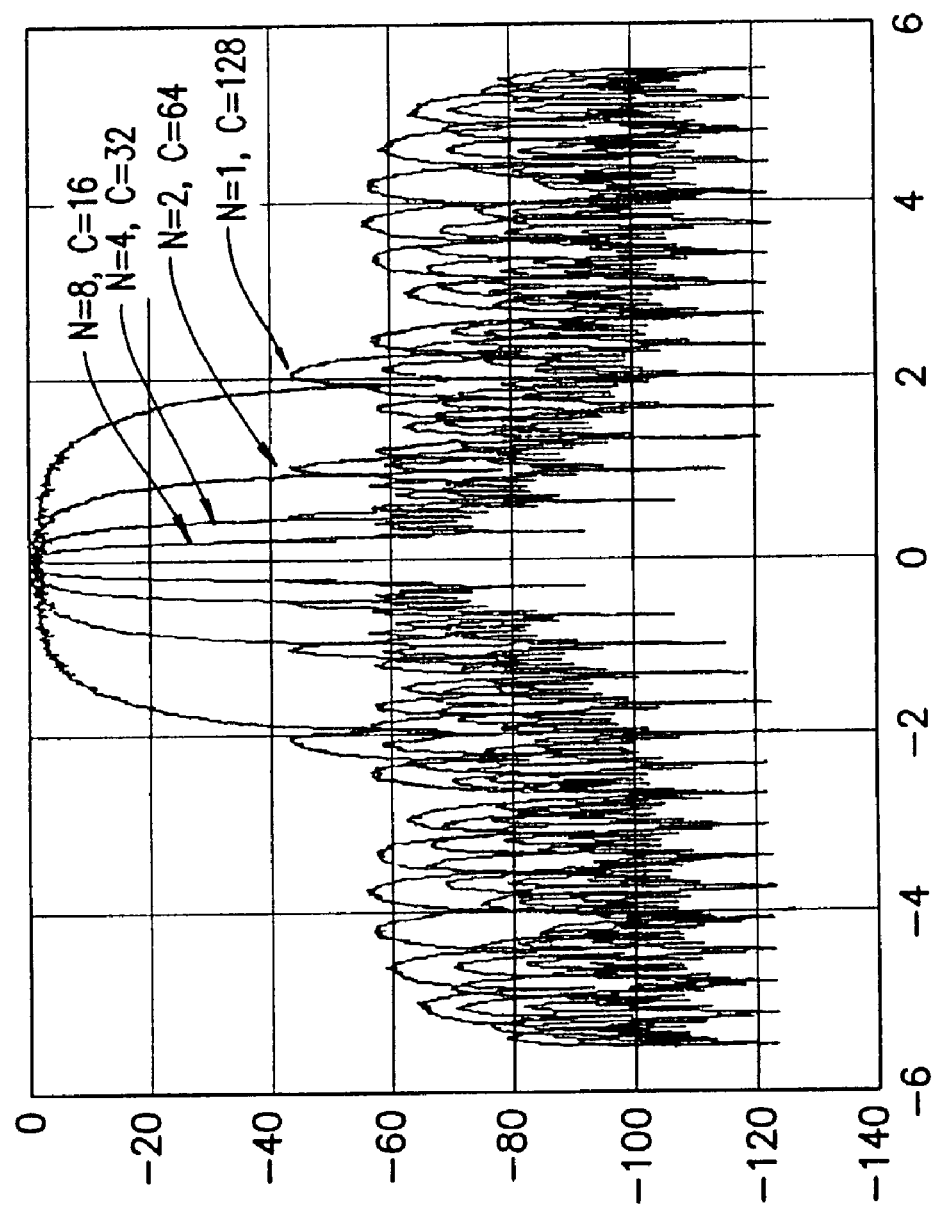
FIG. 7C is a graph depicting the power spectral densities for variable bandwidth systems using chip repetition assuming randomized Hadamard codes and square root-raised cosine filtering ($\beta=0.35$), where C is the capacity measured in 32 kbps users per frequency sub-channel.

As a further example, assume a DS-CDMA system operating with a variable spreading rate of P=1 and P=8 up to P=128 with $R_{chip}$=2.72 Mcps. The DS-CDMA system is specifically designed to operate within a 3.5 MHz channel plan with variable data rate code sets. The chip repetition technique in accordance with this invention may be employed to advantage to design a variable spread factor code set having variable bandwidth and capacity. Table 1 and FIG. 7C illustrate the achievable signal bandwidths and user capacities assuming square root-raised cosine filtering ($\beta$=0.35) and chip repetition.

TABLE 1

Chip repetition in a single frequency sub-channel

| Replication Factor N | Maximum Number of 32 kbps Users C | Sub-Channel Bandwidth | Capacity |
|---|---|---|---|
| 1 | 128 | 3.5 MHz | 4.096 Mbps |
| 2 | 64 | 1.75 MHz | 2.048 Mbps |
| 4 | 32 | 875 MHz | 1.024 Mbps |
| 8 | 16 | 437.5 kHz | 512 kbps |

As a further example, assume that a 3.5 MHz bandwidth DS-CDMA system is required to operate in a 5 MHz channel plan. Since DS-CDMA system has a bandwidth of 3.5 MHz, it is technically compliant with a 5 MHz channelization. However, the spectral efficiency of the system, when aggregated over a 5 MHz channel rather than a 3.5 MHz channel, reduces from 4.048/3.5=1.156 bps/Hz to 4.048/5=0.8096 bps/Hz. The loss of spectral efficiency may not be acceptable.

Figure 7D:
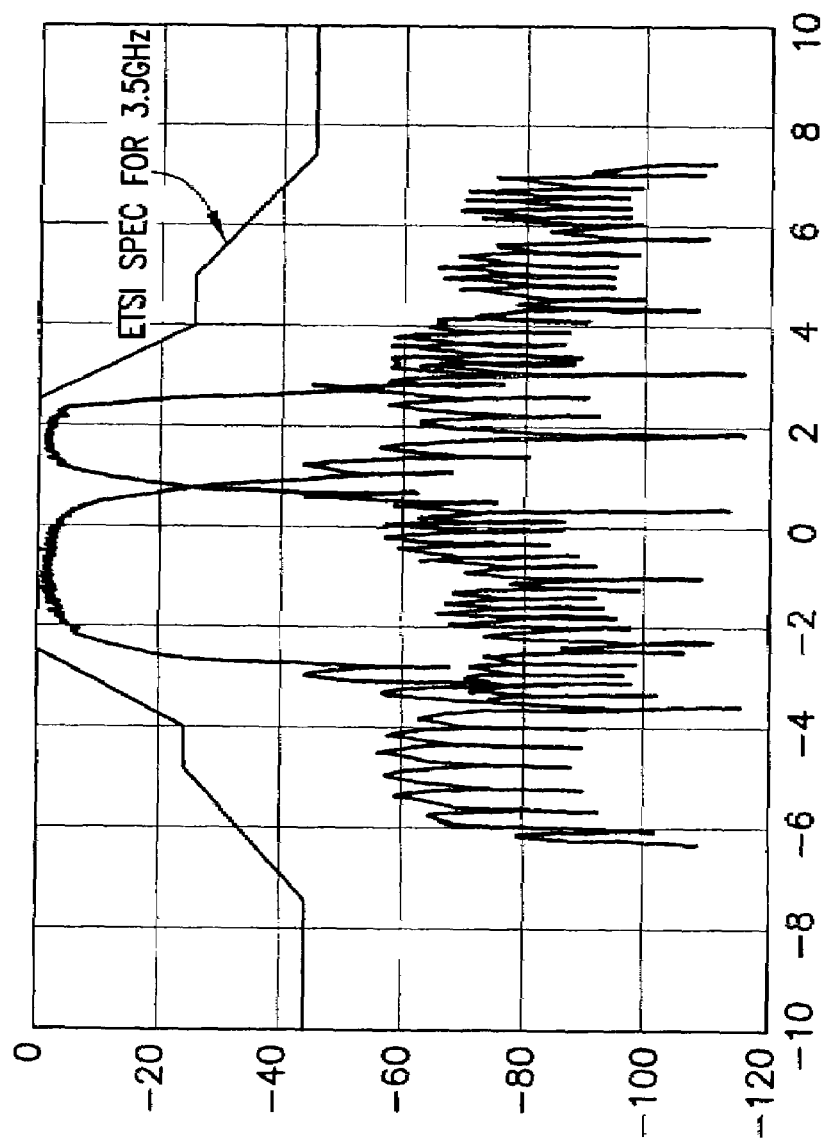
FIG. 7D is a graph depicting the use of chip repetition for servicing a 5 MHz channel using two frequency sub-channels, wherein in FIGS. 7A–7D the y-axis represents the power spectral density and the x-axis represents frequency.

However, chip repetition may be used to prevent the loss of spectral efficiency in the exemplary 5 MHz channel plan. For example, assume that the DS-CDMA system services four frequency sub-channels per base station 11, then one may service a 5 MHz channel using two frequency sub-channels, wherein one sub-channel uses the original waveform and code set with an occupied signal bandwidth of 3.5 MHz, and the second frequency sub-channel uses a code set constructed via chip repetition with N=2 and bandwidth of 1.75 MHz (see FIG. 7D). The total system capacity in the 5 MHz channel is 4.096+2.048=6.144 Mbps or 192 simultaneous 32 kbps users, giving a spectral efficiency of 1.23 bps/Hz. Notice that the spectral efficiency of the 5 MHz system is actually greater than the spectral efficiency of the 3.5 MHz system.

The foregoing teachings have thus provided a technique to scale the bandwidth and the capacity of a DS-CDMA system by designing code sets with improved spectral properties. The code sets are designed by beginning with a base code set with a smaller spreading gain and then repeating chips. The result is a code set with fewer spreading codes and a smaller aggregate signal bandwidth. The code design process allows existing DS-CDMA systems to scale bandwidth and capacity without hardware modifications, provided the number of chips/symbol does not change. One important benefit that is derived from the use of the teachings of this invention is in enabling DS-CDMA systems designed for a particular channelization to fit into smaller channel plans.

These teachings provide a technique for creating a variable bandwidth CDMA system by storing every chip in one, two, four, eight, etc., times in repetition within a PN code memory to produce an effective chip rate of one, one half, one fourth, one eight, etc. times the basic system chip rate. The lower rate chip sequences may be pulse shaped, particularly if digital FIR filtering is used in the transmitter and the receiver of the DS-CDMA system.

While described above primarily in the context of a synchronous DS-CDMA system, it should be realized that these teachings can be applied as well to asynchronous CDMA systems. It should also be realized that if one were to use a cover code with the replicated code set that the cover code would also be a replicated code with the same replication design. Also, if using a digital FIR pulse shaped filter then the FIR filter is preferably reprogrammed to match the change in the RF bandwidth achieved by the chip replication operation. For example, a digital FIR having an RF bandwidth of 3.5 MHz would be reprogrammed to exhibit an RF bandwidth of 1.75 MHz when utilizing a code set produced by chip replication. Furthermore, while described in the context of various exemplary modulation and channel coding formats, frequencies, numbers of antenna elements, spreading factors, symbol rates and the like, it should further be realized that these are exemplary, and are not to be construed in a limiting sense upon the practice of this invention.

Thus, while these teachings have been particularly shown and described with respect to preferred embodiments thereof, it will be understood by those skilled in the art that changes in form and details may be made therein without departing from the scope and spirit of the invention described above.

What is claimed is:

1. A method for obtaining a spreading code set for a code division multiple access communications system, comprising:

providing a first spreading code set requiring a first signal bandwidth; and repeating chips to generate from the first spreading code set a second spreading code set comprised of fewer spreading codes and requiring a second signal bandwidth that is less than the first signal bandwidth.

2. A method for obtaining a spreading code set for a code division multiple access communications system, comprising:

generating a P'×P' spreading code set where P'=P/N, where P is the spreading gain in chips/symbol and where N is an integer multiple of 2; and replicating chips in each spreading code by N to produce a P'×P spreading code set.

3. A method as in claim 2, wherein the step of generating includes randomizing the P'×P' spreading code set.

4. A method as in claim 2, and further comprising a step of loading the P'×P spreading code set into system hardware and operating with the loaded spreading code set with a bandwidth that is less than the bandwidth that would be required to operate with the P'×P' spreading code set.

5. A method as in claim 4, and further comprising a step of reprogramming a digital FIR pulse shape filter to accommodate the change in system bandwidth.

6. A method for generating a spreading code set for use in a deployment of a synchronous, direct sequence code division multiple access communications system, comprising:

generating a P'×P' Hadamard spreading code set where P'=P/N, where P is the spreading gain in chips/symbol and where N is an integer multiple of 2, the P'×P' Hadamard spreading code set requiring a channel bandwidth of X Hz for operation; and replicating chips in each spreading code by N to produce a P'×P spreading code set that requires a channel bandwidth of Y Hz for operation, where Y<X.

7. A method as in claim 6, wherein the step of generating includes randomizing the Hadamard spreading code set.

8. A method as in claim 6, and further comprising a step of loading the P'×P spreading code set into hardware of the deployment of the synchronous, direct sequence code division multiple access communications system, and operating with the channel bandwidth of Y Hz.

9. A method as in claim 8, and further comprising a step of reprogramming a digital FIR pulse shape filter to accommodate the change in system bandwidth from X Hz to Y Hz.

10. A synchronous, direct sequence code division multiple access communications system, comprising a memory device that stores a spreading code set generated from a (P/N)×(P/N) Hadamard spreading code set, where P is the spreading gain in chips/symbol and N is an integer multiple of 2, the stored spreading code set being generated from the Hadamard spreading code set by repeating chips in each spreading code of the Hadamard spreading code set by a factor of N to produce a (P/N)×P spreading code set that requires a channel bandwidth of Y Hz for operation, where Y<X and X is the channel bandwidth required for operation by the Hadamard code set.

11. A system as in claim 10, wherein the memory device is located within a base station.

12. A system as in claim 10, wherein the memory device is located within a subscriber station.

13. A method as in claim 3, wherein randomizing comprises permuting at least one row or column of the P'×P' spreading code set.

14. A method as in claim 7, wherein randomizing comprises permuting at least one row or column of the Hadamard spreading code set.

* * * * *